United States Patent
Desmarais

(10) Patent No.: US 7,458,468 B2
(45) Date of Patent: Dec. 2, 2008

(54) FUEL FILTER DIVERTER

(75) Inventor: Christopher P. Desmarais, Garner, NC (US)

(73) Assignee: Purolator Filters NA LLC, Fayetteville, NC (US)

( * ) Notice: Subject to any disclaimer, the term of this patent is extended or adjusted under 35 U.S.C. 154(b) by 272 days.

(21) Appl. No.: 10/634,383

(22) Filed: Aug. 5, 2003

(65) Prior Publication Data

US 2005/0029184 A1    Feb. 10, 2005

(51) Int. Cl.
*B01D 35/00* (2006.01)
*B01D 27/00* (2006.01)

(52) U.S. Cl. ............ 210/437; 210/435; 210/439; 210/441; 210/442; 210/446; 210/450; 210/456; 210/493.2

(58) Field of Classification Search .......... 210/435, 210/439, 441, 442, 450, 456, 493.2, 437, 210/446

See application file for complete search history.

(56) References Cited

U.S. PATENT DOCUMENTS

| | | | | |
|---|---|---|---|---|
| 2,031,935 A | * | 2/1936 | Cuno | 210/133 |
| 2,801,751 A | * | 8/1957 | Thomas | 210/133 |
| 5,399,264 A | * | 3/1995 | Pulek et al. | 210/450 |
| 5,685,985 A | * | 11/1997 | Brown et al. | 210/450 |
| 5,766,289 A | | 6/1998 | Haggard | |
| 6,045,693 A | * | 4/2000 | Miller et al. | 210/248 |
| 6,068,763 A | | 5/2000 | Goddard | |
| 6,085,915 A | * | 7/2000 | Schwandt et al. | 210/411 |
| 6,171,492 B1 | | 1/2001 | Hedgepeth et al. | |
| 6,248,236 B1 | * | 6/2001 | Hodgkins | 210/232 |

FOREIGN PATENT DOCUMENTS

| | | |
|---|---|---|
| JP | 8-226358 A | 9/1996 |
| JP | 2001-104827 A | 4/2001 |
| WO | WO 01/30477 | 5/2001 |

OTHER PUBLICATIONS

EP04254677 Search Report.
European office action dated Sep. 8, 2008.
Japanese office action dated Jul. 29, 2008, with English translation.
Abstract for JP2000501991, which corresponds to US5685985, which is already of record.

* cited by examiner

*Primary Examiner*—John Kim
(74) *Attorney, Agent, or Firm*—Crowell & Moring LLP

(57) ABSTRACT

A fuel filter assembly includes a housing having an end supporting a first tube. The housing defines a cavity that is enclosed by a cover opposite the end. A diverter is arranged within the cavity and includes first and second sides with the first side adjacent to the housing end. The diverter includes a wall on the first side in sealing engagement with either the first tube or the housing end. The diverter is constructed from a first material forming a base and a second material supported by the first material defining at least a portion of the first side. The second material may be overmolded onto the first material. Preferably, the first material is a plastic and the second material is an elastomer forming a gasket suitable for providing a seal between the diverter and the housing. One end of the filter media is embedded in the adhesive on the second side of the diverter.

13 Claims, 3 Drawing Sheets

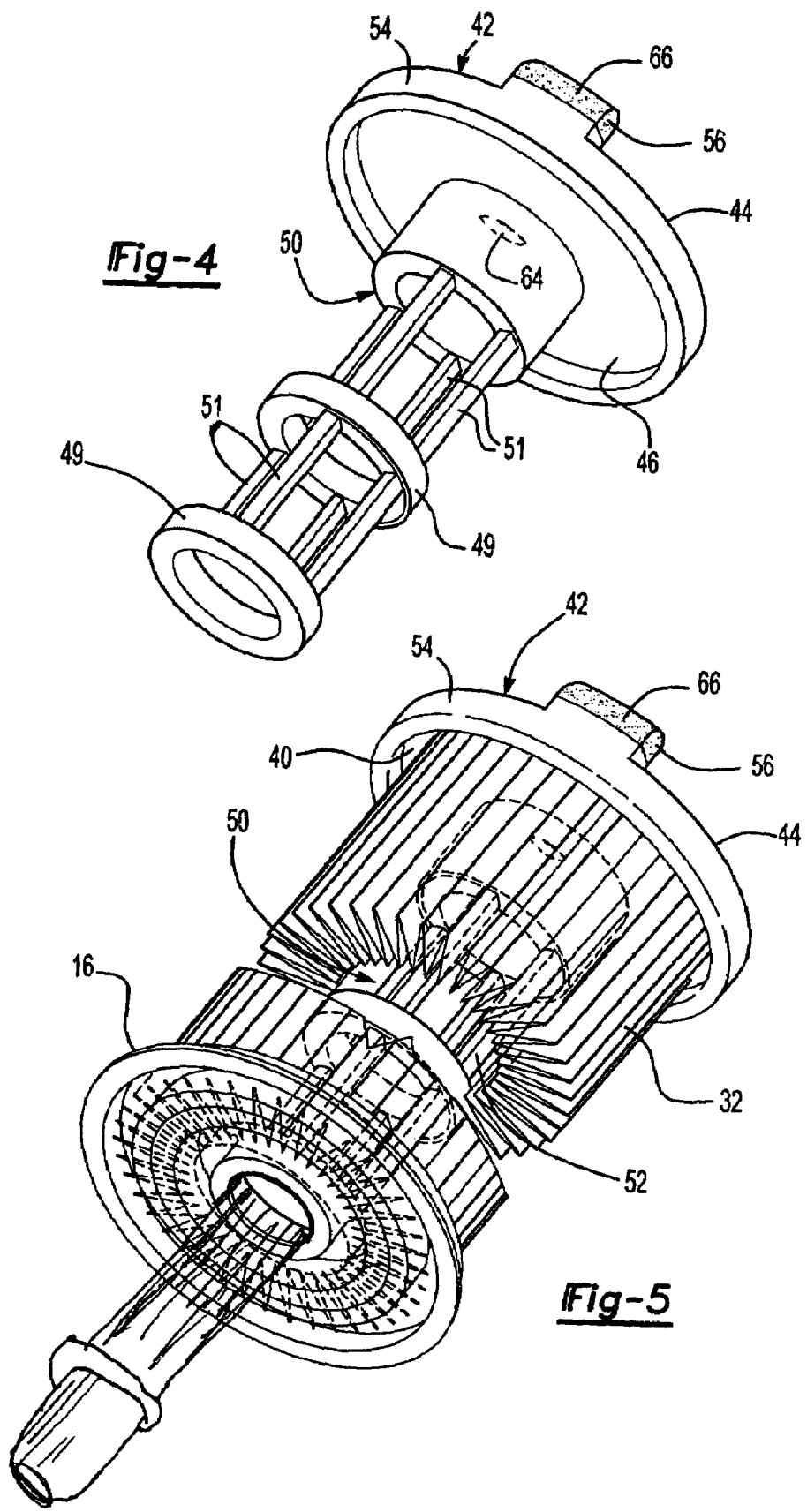

FUEL FILTER DIVERTER

BACKGROUND OF THE INVENTION

This invention relates to a filter assembly, and more particularly, to a fuel filter diverter for use with a pleated paper filter element.

Fluid filters such as fuel filters incorporate a filter media such as a pleated paper element to remove particulates from the fluid. The filter media has an inlet side and an outlet side that must be sealed from one another to ensure that the fluid passes through the filter media. To this end, the opposing ends of the filter media may be secured to an end cap and a filter housing cover by embedding the ends of the filter media in an adhesive arranged on the end cap and cover. The cover is mechanically secured to a housing case to seal the filter media within the housing.

In one type of fuel filter commonly referred to as a three port filter, three tubes are in fluid communication with the filter housing. For this type of configuration, a diverter is used between the end cap supporting the filter media and the housing to direct the flow of fluid in a desired flow path. Specifically, an O-ring is arranged between the diverter and the end cap to seal the inlet side from the outlet side of the filter media. Another O-ring is supported on the opposite side of the diverter to create a seal between the diverter and one of the tubes. The diverter includes a hole to fluidly connect the tube with one side of the filter media.

As may be appreciated from the above discussion, prior art three port fuel filter arrangements utilize numerous components for directing the flow of fluid and providing seals to separate the inlet and outlet side of the filter media. Therefore, what is needed is an improved filter assembly requiring fewer parts and less assembly.

SUMMARY OF THE INVENTION

The present invention provides a fuel filter assembly including a housing having an end. The housing defines a cavity that is enclosed by a cover opposite the end. The filter assembly may be a three port fuel filter having three tubes with a first tube supported by the end of the housing. In one example, an end portion of the first tube extends into and is in fluid communication with the cavity. A diverter is arranged within the cavity and includes first and second sides with the first side adjacent to the end. The diverter includes an aperture in the first side defined by a wall arranged proximate to the first tube. The wall is in sealing engagement with either the first tube or the housing end. In one example, the aperture is in fluid communication with the second side to permit fluid flow from the first tube.

The diverter is constructed from a first material forming a base and a second material supported by the first material defining at least a portion of the first side. Preferably, the first material is a plastic and the second material is an elastomer forming a gasket suitable for providing a seal between the diverter and the housing. In one example, the gasket may be overmolded onto the plastic diverter base. One end of the filter media is embedded in the adhesive on the second side of the diverter. In this example, the diverter provides a seal about the first tube and with the filter media to seal the inlet and outlet sides of the filter media from one another.

Accordingly, the above invention provides an improved filter assembly requiring fewer parts and less assembly.

BRIEF DESCRIPTION OF THE DRAWINGS

Other advantages of the present invention can be understood by reference to the following detailed description when considered in connection with the accompanying drawings wherein:

FIG. 4 is a bottom side perspective view of the diverter assembly shown in FIG. 2; and FIG. 5 is a bottom side perspective view of the diverter assembly shown in FIG. 4 with the filter media and cover installed.

DETAILED DESCRIPTION OF THE PREFERRED EMBODIMENT

Figure 1:
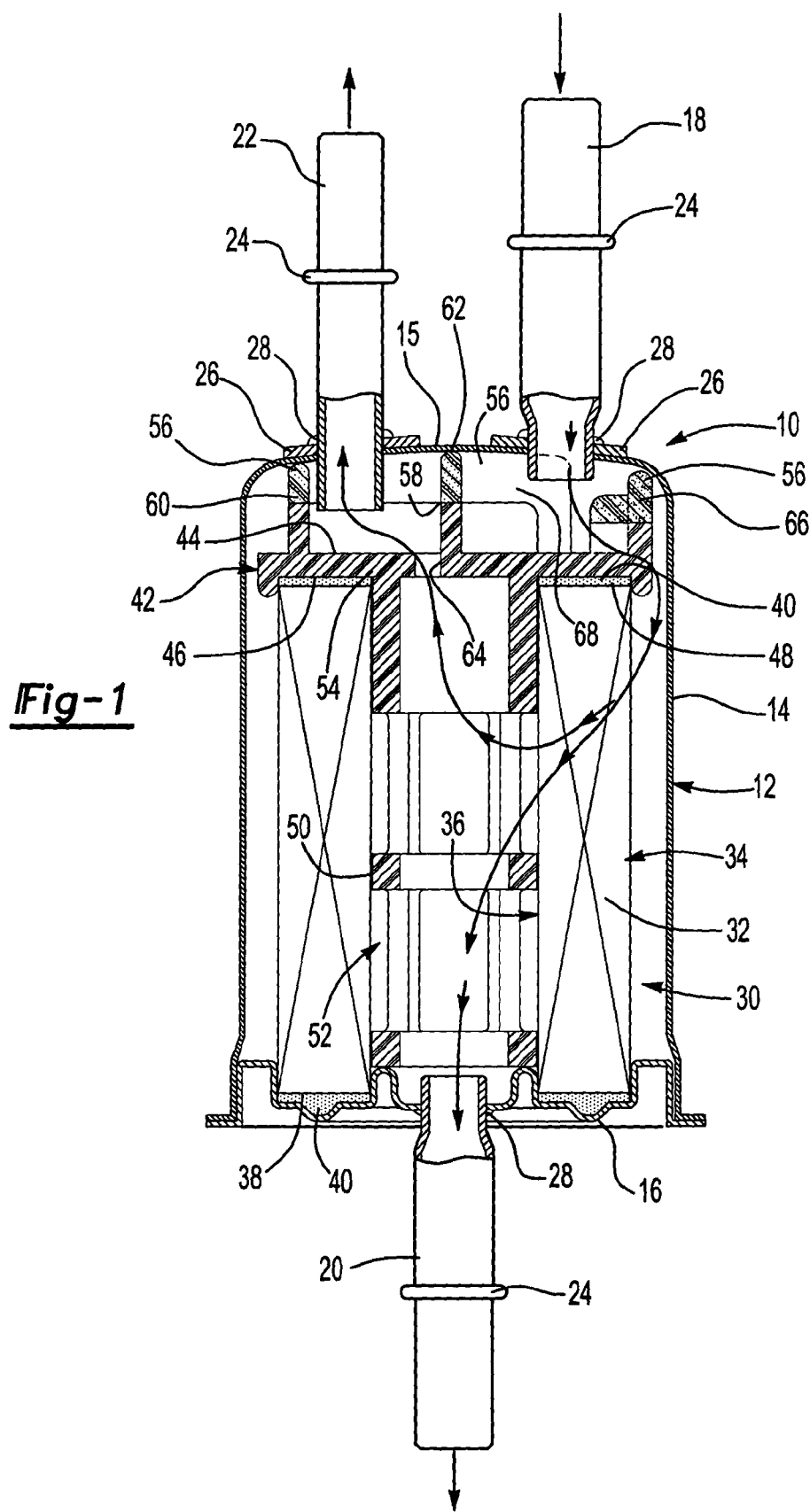
FIG. 1 is a cross-section of an example fluid filter assembly designed according to the present invention.

A filter assembly 10 is shown in FIG. 1 in cross-section. The example assembly 10 includes a housing 12 that may include a case 14 having a cover 16 secured thereto using any suitable attachment method. The assembly 10 shown in FIG. 1 is a three port fuel filter configuration, although one of ordinary skilled in the art will appreciate that this invention is applicable to other arrangements.

An inlet tube 18 is secured to an end 15 of the housing 12, and a return tube 22 is secured to the end 15 spaced from the inlet tube 18. An outlet tube 20 is secured to the cover 16 opposite the inlet 18 and return 22 tubes. Fluid may flow through the assembly 10 in a manner other than that schematically shown in FIG. 1.

The tubes 18, 20, 22 may be secured to the housing 18 in any suitable manner such as by using support washers 26 and braze rings 28 to mechanically attach the tubes to the housing, as is known in the art. The tubes 18, 20, 22 include beads 24 used to facilitate retention of hoses installed onto the tubes, as is well known in the art.

The housing 12 defines a cavity 30 with a filter media 32 arranged in the cavity 30. One type of filter media that may be used is a pleated paper element, which is well known in the art. The filter media 32 includes an inlet side 34 and an outlet side 36, which in the configuration shown are respectively the outer and inner circumference of the filter media 32. The flow may be reversed from the flow indicated in FIG. 1.

The filter media 32 must be sealed within the housing 12 in such a manner so as to ensure that the fluid passes from the inlet side 34 to the outlet side 36 without circumventing the filter media 32 so that particulates are removed from the fluid. To this end, one end 38 of the filter media 32 is secured to the cover using an adhesive 40 such as plastisol. A diverter 42 includes opposing first 44 and second 46 sides with an opposing end 48 of the filter media 32 secured to the second side 46 using adhesive 40. In this manner, the filter media 32 is sealed between the diverter 42 and the cover 16 preventing fluid from circumventing the filter media 32.

Figure 2:
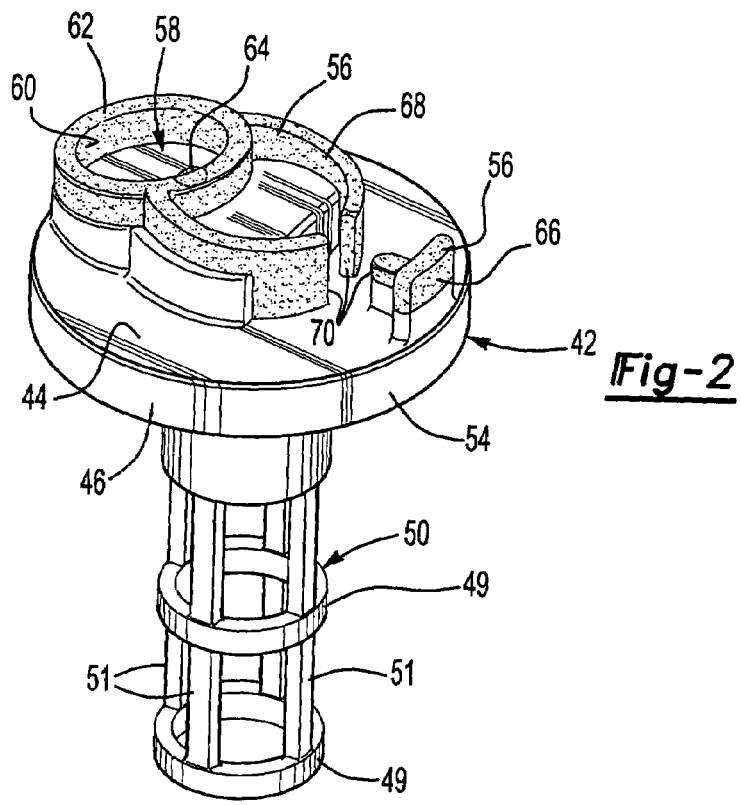
FIG. 2 is a top perspective view of the example diverter assembly from FIG. 1.
Figure 3:
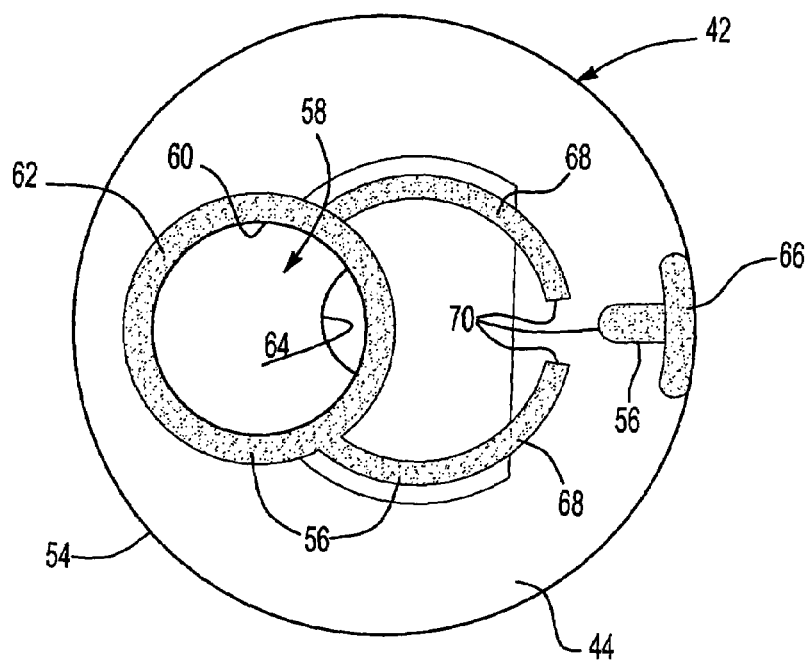
FIG. 3 is a top elevational view of the diverter assembly shown in FIG. 2.

In the illustrated example, a center tube 50 extends from the second side 46 into a central opening 52 defined by the filter media 32. The center tube 50 provides structural support for the pleated paper element to maintain the shape of the filter media 32 and prevent it from collapsing under the flow of fluid. For example, the center tube 50 may include several axially spaced rings 49 connected to one another by legs 51, best seen in FIGS. 2 and 4. However, it should be understood that the present invention diverter 42 may not necessarily include a center tube or may include a center tube of a different configuration.

A seal is also be created between the diverter 42 and the housing 12 to ensure that fluid from the outlet side 36, which corresponds to the central opening 52 of the configuration shown, flows to the return tube 22 preventing the fluid from the inlet 34 and the outlet 36 sides from intermixing. The example diverter 42 includes a base 54 constructed from a first material such as plastic. A second material such as an elastomer is supported on the base to provide a gasket 56. In one example, the second material may be overmolded onto the diverter base. One type of suitable plastic may be a nylon 66, and one type of suitable elastomer may be VITON. Of course, any suitable material may be used that is chemically resistant to the fluid in which the diverter is immersed. Furthermore, the materials are selected to provide material compatibility during the molding process. That is, the melt temperature of the over-molded material should not exceed the melt temperature of the material that is molded first. Moreover, it should be understood that processes other than over-molding may be utilized to manufacture a diverter designed according to this invention. Additionally, the base may be molded onto the gasket.

The gasket 56 creates a seal between the diverter 42 and the end 15 of the housing 12. The gasket 56 at least partially defines the first side 44. For example, a cylindrical wall 60 may be arranged about an end portion of the return tube 22 to define an aperture 58 and create a seal between the return tube 22 and one side of the filter, which in this case is the outlet side. More specifically, the cylindrical wall 60 includes an edge 62 that is in abutment with the inner surface of the end 15 when the diverter 42 is installed into the case 14. A hole 64 extends between the first 44 and second 46 sides to provide fluid communication between the return tube 22 and the outlet side 36 of the filter media 32.

In the illustrated example, a side wall 66 is arranged opposite the cylindrical wall 60 on the first side 44. The side wall 66 may be constructed from the gasket material 56 and ensures a desired alignment of the diverter 42 with respect to the housing 12 during assembly by compressing in a similar manner to that of the cylindrical wall 60. However, it should be understood that the side wall 66 may be of a different configuration than shown or eliminated entirely.

The example diverter includes a central wall 68 having arcuate segments and is arranged between the cylindrical wall 60 and the side wall 66 to provide additional support for the diverter 42 against the housing 12. The illustrated central wall 68 and side wall 66 may provide support edges 70 that ensure that the end of the inlet tube 18 within the housing 12 is not blocked by the diverter 42. The central wall 68 may be of a different configuration than shown or eliminated entirely.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A fluid filter assembly comprising:
a housing having an end and defining a cavity;
a first tube supported by said end and in fluid communication with said cavity;
a diverter arranged within said cavity further comprising first and second sides spaced from one another;
a first material and a second material supported on said first material, said second material defining at least a portion of said first side; and
a filter media supported by said second side, said first side having a first wall defining an enclosed aperture with a hole extending from said enclosed aperture to said second side, and said second material providing said first wall and a second wall, said second wall on said first side, said hole outside of said second wall;
wherein said filter media defines a central opening and said second side includes a center tube provided by said first material at least partially within said central opening, said first material providing a base with said filter media secured to said base, and said center tube extending from said base to provide a unitary structure; and
wherein said center tube includes rings and legs providing a perforated structure; a second tube supported by said end and in fluid communication with said hole and a third tube at other end of said housing in fluid communication with said central opening.

2. The assembly according to claim 1, wherein said first wall is cylindrical and defines an aperture with an edge of said first wall in sealing engagement with said end of said housing.

3. The assembly according to claim 2, wherein said diverter includes a hole extending between said first and second sides and in fluid communication with said aperture and said opening.

4. The assembly according to claim 2, wherein said second material defines at least a portion of said first side including said edge of said first wall.

5. The assembly according to claim 1, wherein said housing includes a case defining said end and a cover opposite said end secured to said case, said cover supporting a third tube in fluid communication with said cavity, and said filter media arranged between said second and third tubes.

6. The assembly according to claim 1, wherein said base supports said filter media with said first wall comprising a gasket supported by said base, said base extending radially outwardly beyond said filter media.

7. A fluid filter diverter comprising:
first and second sides spaced from one another;
a first material and a second material supported on said first material, said second material defining at least a portion of said first side; and
a filter media supported by said second side, said first side having a first wall defining an enclosed aperture with a hole extending from said enclosed aperture to said second side, and said second material providing said first wall and a second wall, said second wall on said first side, said hole outside of said second wall;
wherein said filter media defines a central opening and said second side includes a center tube provided by said first material at least partially within said central opening, said first material providing a base with said filter media secured to said base, and said center tube extending from said base to provide a unitary structure; and
wherein said center tube includes rings and legs providing a perforated structure.

8. The diverter according to claim 7, wherein said first material is a plastic and said second material is an elastomer.

9. The diverter according to claim 7, wherein said first wall is cylindrical with an edge of said first wall defined by said second material.

10. The diverter according to claim 7, wherein said second material is adhered to said first material.

11. The diverter according to claim 7, wherein said center tube extends along a longitudinal axis, and said hole is offset radially from said longitudinal axis.

12. The diverter according to claim 7, wherein an adhesive is arranged on said second side, and said filter media is embedded in said adhesive securing said filter media to said second side.

13. The diverter according to claim 7, wherein said first wall is unbounded by said second wall.

* * * * *